United States Patent [19]
Nalle, Jr.

[11] 3,884,753
[45] May 20, 1975

[54] OPEN TUBE WITH NET OVERLAY

[76] Inventor: George S. Nalle, Jr., 108 W. 2nd St., Austin, Tex. 78701

[22] Filed: Dec. 17, 1973

[21] Appl. No.: 425,268

Related U.S. Application Data

[63] Continuation of Ser. No. 167,929, Aug. 2, 1971, abandoned, which is a continuation-in-part of Ser. No. 762,519, Sept. 25, 1968, Pat. No. 3,620,883.

[52] U.S. Cl. ............... 428/36; 52/11; 156/172; 156/178; 428/358; 264/209; 425/66; 428/126; 428/177; 428/222
[51] Int. Cl. ............................................. B32b 1/00
[58] Field of Search ........ 161/89, 125, 139, DIG. 6, 161/57; 156/167, 172, 176–178, 244; 264/209, 210, 257, 281, DIG. 81; 52/11; 425/66; 61/14, 16

[56] References Cited
UNITED STATES PATENTS

| | | | |
|---|---|---|---|
| 174,281 | 2/1876 | Moulton | 61/14 |
| 2,336,086 | 12/1943 | Goldman | 161/47 |
| 2,526,271 | 10/1950 | Probst | 52/11 |
| 3,118,180 | 1/1964 | Nalle, Jr. | 156/500 |
| 3,123,512 | 3/1964 | Mercer | 156/500 |
| 3,156,099 | 11/1964 | Dailey | 61/14 |
| 3,297,509 | 1/1967 | Mercer | 156/290 |
| 3,300,911 | 1/1967 | Riddell | 52/16 |
| 3,417,570 | 12/1968 | Pegan et al. | 161/125 |

Primary Examiner—George F. Lesmes
Assistant Examiner—Paul J. Thibodeau
Attorney, Agent, or Firm—Arnold, White & Durkee

[57] ABSTRACT

Hollow extruded thermoplastic tubular members having an open segment or gap are provided with a net or openwork overlay extending transversely with respect to the gap and fused to the member at each side thereof to provide a self-supporting open tube structure with a net overlay.

10 Claims, 8 Drawing Figures

OPEN TUBE WITH NET OVERLAY

RELATED APPLICATIONS

This application is a continuation of copending application Ser. No. 167,929, filed Aug. 2, 1971, now abandoned which in turn is a continuation-in-part of copending application Ser. No. 762,519, filed Sept. 25, 1968, by George S. Nalle, Jr., now U.S. Pat. No. 3,620,883, entitled "Apparatus for Extruding Plastic Netting." Accordingly, this application claims the benefit of the filing dates of said prior application Ser. No. 167,929 and upon said prior application Ser. No. 762,519 as to all subject matter disclosed therein.

FIELD OF THE INVENTION

This invention relates to extruded plastic products, and, more specifically, to a self-supporting extruded plastic hollow tubular structure having a longitudinal gap with a net overlay.

BACKGROUND OF THE INVENTION

Openwork or net-like products of thermoplastic material may be formed by simultaneously extruding a number of separate streams or filaments of the thermoplastic and guiding the filaments while still softened and fusible to intermittently contact one another. Both tubular and flat plastic nets are formed by this technique in many different patterns. Many types of extrusion die assemblies and apparatus have been developed for producing varieties of patterns of plastic net, exemplary ones of these being disclosed in my U.S. Pat. No. 3,012,275, 3,019,147, 3,067,084, 3,118,180, and 3,127,298.

SUMMARY OF THE INVENTION

It is a primary feature of the present invention to provide extruded thermoplastics in a variety of composite structures, including solid shapes as well as openwork, which are either usable as the final product in the form extruded, or easily converted to usable form. Another feature is the provision of plastic products such as septic tank drain field tiles, roof gutters, and like products which include solid and fairly rigid shapes along with openwork overlay.

In accordance with certain exemplary embodiments of the invention, an extrusion die head assembly is used which includes a central non-rotating die plate along with a circular die surrounding and rotating or oscillating with respect to the central die. The outer die includes a circular or arcuate pattern of extrusion openings, while the central die has a pattern of openings or a single opening which may be characterized as defining an "open" cylindrical or trough-like figure, that is, a U-shape as distinguished from a circle. Hot plastic material is forced through the die under pressure, and is guided or drawn away, using suitable mandrels in some cases, so that the extrudates from the various openings will at least partially contact one another and fuse together. The general concept of the invention not only permits a wide variety of end products as described herein which were not heretofore produced with facility, but also many other shapes and variations may be envisioned.

BRIEF DESCRIPTION OF THE DRAWING

Novel features which are believed to be characteristic of the invention are set forth in the appended claims. The invention itself, however, as well as further features and advantages thereof, may best be understood by reference to the following detailed description or particular embodiments, when read in conjunction with the accompanying drawing, wherein:

FIGS. 2 and 4 are pictorial views of segments of products produced by the die heads of FIGS. 1 and 3, respectively, while

The drawings are considered a part of this specification and are incorporated herein. It is noted that like parts appearing in several figures of the drawings will bear like reference numerals.

DESCRIPTION OF THE PREFERRED EMBODIMENTS

Figure 1:
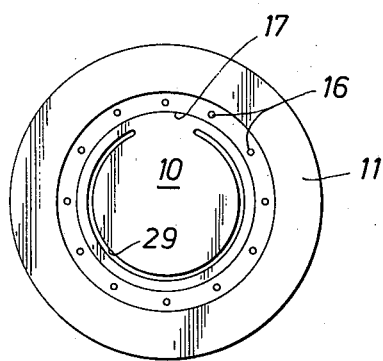
FIG. 1 is a bottom view of an extrusion die head assembly for producing products according to one embodiment of the invention.

With reference now to FIG. 1 of the drawings, a die head assembly for extruding plastic is illustrated according to the invention. The die head includes an inner, non-rotating die 10, and an outer, rotating die 11. Means are provided above the die head for continuously supplying molten plastic under pressure to extrusion opening 29. Similarly, means are provided to continuously admit molten plastic under pressure to a plurality of extrusion openings 16 which are arranged in a circle along the inner slanted face of die 11. The openings 16 are slanted inward at an angle to aid in assuring contact of the pliable and fusible plastic as it exits from the extrusion openings so that portions of the net will be adhered to one another. The diameter of the circle of openings 16 is usually about 1 or 2 inches, although smaller or larger sizes may be used, of course. The size of individual openings would depend upon the desired appearance of the product and other factors, but may be as small as ten or twenty mils, although usually much larger. The greaater the rigidity of the material being extruded, the smaller may be the die openings while producing a structure sufficiently rigid to support itself.

Die 10 fits closely within a cylindrical opening 17 in die 11 so that die 11 may rotate slideably with respect to the stationary inner die, but yet molten plastic will not be extruded out through the interface to any appreciable extent. A seal may be provided rather than relying solely upon close fit.

Figure 3:
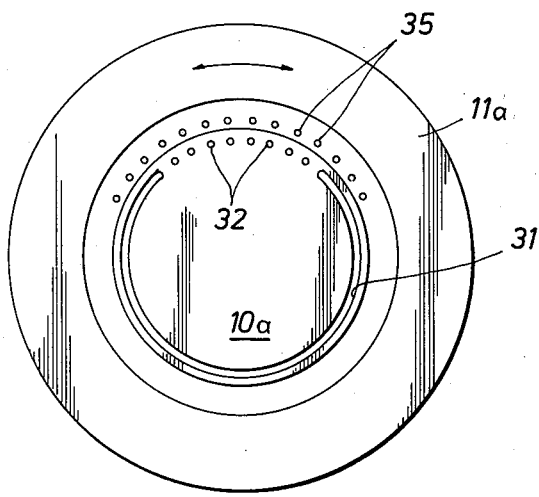
FIG. 3 is a bottom view of an extrusion die head assembly for producing products according to another embodiment of the invention.

The structural parts of the complete extrusion system used with the die head assembly of FIGS. 1 and 3 would be conventional and need not be described or illustrated here. Ordinarily, pressurized plastic would be supplied to the chamber or cavity above the die head from an extrusion worm or screw, and a heating system would maintain the thermoplastic material at the proper temperature for extrusion. A cooling bath, using water for example, would be positioned below the die head to solidify the extruded material. Supporting means would secure the stationary die 10 and the outer rotary die 11 to the upper portion of the chamber and in proper relation. The outer rotary die 11 would be rotated by conventional means, such as a gear assembly or belt and pulley arrangement.

In operation of the die head assembly of FIGS. 1 and 3 according to the invention, the stationary die 10 will extrude a trough-like product. Meanwhile, filaments extruded from openings 16 in the circular rotary die 11 will encircle the trough in a net pattern, and will be bonded thereto.

The terms "trough" and "trough-like" when used herein to define the configuration of an extrudate refer to a hollow tubular structure having a cylindrical surface with an open segment or gap extending the length of the structure. In this connection, a cylindrical surface is that surface defined by any straight line moving parallel to a fixed straight line and intersecting a closed curve.

Separate sources of molten plastic may be provided for each die head as described above, one supplying the stationary die and the other supplying separately the rotary die. In this manner, plastic material of two different colors, or two different types of plastic material, may be used for the inner trough and outer filaments. Intersecting decorative or structural effects may be thus provided. A rotary die head for containing two separate sources of plastic or different colors is set forth in my U.S. Pat. No. 3,118,180, issued Jan. 21, 1964.

Figure 2:
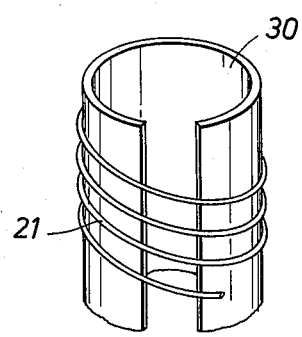

In the embodiment of the invention illustrated in FIG. 1, central stationary die 10 includes a horseshoe-shaped circular slot 29 which would function to produce an almost circular cylindrical extruded tube 30 as seen in the pictorial view of FIG. 2. The spiral filaments 21 produced by the rotating outer die 11 would be generally as shown in FIG. 2. These filaments 21 would be adhered to the cylindrical trough 30 around most of its periphery, and would provide a net-like covering over the opening in the cylinder. This product would be made of appropriate size and thickness to be used as e.g., drainfield pipe for septic tank systems, or a drainage gutter for roofs, wherein the filament net functions to keep out leaves and outer debris.

A pair of concentric counter-rotating circular dies may be used with the embodiment of FIG. 1, or the other embodiments, to produce a crisscross type of netting rather than netting made up merely of parallel strands. Apparatus as in my U.S. Pat. No. 3,067,084 may be used for this purpose.

The plastic materials utilized with the various embodiments of the invention may be any of the commercially available thermoplastics, such as polyethylene, vinyl polymers, styrene polymers, acrylic polymers (or copolymers of the foregoing), polypropylene, nylon, etc. An especially attractive product is produced by incorporating a foaming agent in the plastic material prior to extruding. The foaming agent may comprise a material known as Selogen as sold by U.S. Rubber Company. Many other foaming agents are available which are suitable for this purpose. The foaming agent imparts to plastic a deep satin-like lustre which is particularly attractive when incorporated with pastel colors when the product is oriented.

Figure 4:
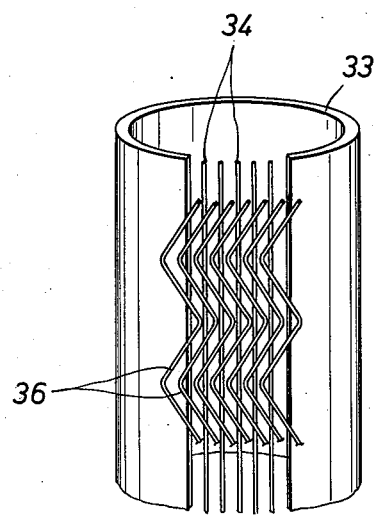

Referring now to FIG. 3, an embodiment of the invention similar to that of FIG. 1 is illustrated. Here, inner die 10a is stationary and includes a U-shaped extrusion opening 31 similar to the opening 29 of FIG. 1. Further, die 10a has a plurality of extrusion openings 32 in the gap of the U-shaped opening so that the product extruded by this die will be a sleeve or trough 33 as seen in FIG. 4, having a plurality of strands or filaments 34 in the gap. A movable circular die 11a surrounding the inner die of FIG. 3 has a plurality of openings 35 adjacent the gap in the U-shaped opening. This outer die is mechanically coupled by gears or a belt and pulley arrangement to a motor drive mechanism of conventional form which produces oscillatory motion of the die. This die oscillates through an arc of perhaps ten or fifteen degrees, more or less, but at least as great as the distance between adjacent extrudate steams from die 10a, at a rate such that a net-like pattern is defined as might be seen in FIG. 4. The openings 35 in die 11a extrude filaments 36. The overlay of filaments 36 adhers to filaments 34 and to the trough 33 at points of intersection, while the extruded plastic is still tacky or fusible. The structure of the die head assembly may be similar to that of FIG. 1, with the remaining parts of the extrusion apparatus such as the plastic supply, the heater, the motive power means, the drawing and cooling means, etc., being as set forth in my aforementioned patents.

In place of the oscillatory motion of die 11a in the embodiment of FIG. 3, the motion may be circular as in FIG. 1, in which case the pattern of openings in the outer die might be a complete circle rather than only a segment of a circle. The overlay of filaments would in such case completely encircle trough 33.

The product produced by the embodiment of FIGS. 3 and 4 may be of various sizes and materials. To produce a drain gutter as mentioned above, extrusion opening 31 would be of several inches in diameter, and the thickness or width of opening 31, as well as as the diameter of the filaments, would be perhaps 100 mils, more or less, as would apply to FIGS. 1 and 2.

Figure 5:
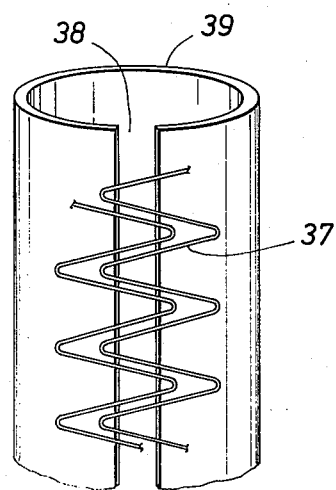
FIG. 5 is a modification of the product of FIG. 2.

Instead of rotary motion in a full circle, the oscillatory overlay techniques of FIGS. 3 and 4 may be used in the embodiment of FIGS. 1 and 2, where filaments in the gap are not present, provided the arc through which the outer die rotates exceeds the arc width of the gap in U-shaped opening 29. An example of a product made in this manner is seen in FIG. 5, where oscillatory-type net 37 covers a gap 38 in a trough-shaped central part 39.

Figure 6:
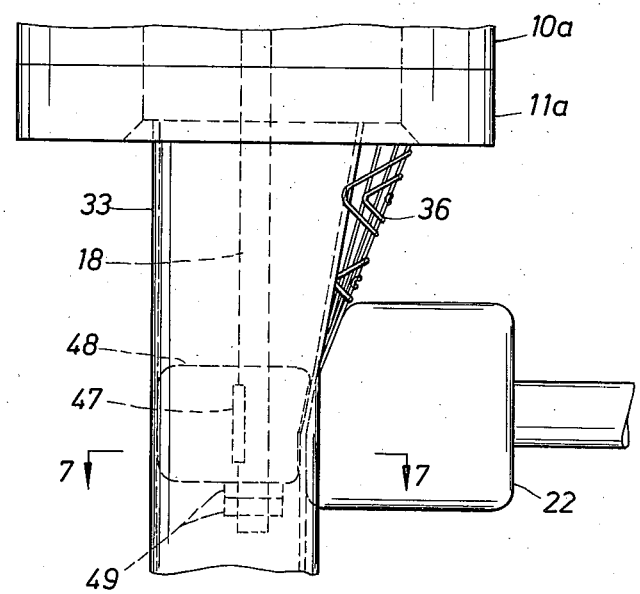
FIG. 6 is an elevation view in schematic form of the extrusion die head of FIG. 3 showing the apparatus in operation with inner and outer mandrels.

In FIG. 6 a side view of the extrusion die head of FIG. 3 is presented in schematic form illustrating one embodiment of its operation. Stationary inner die 10a produces a trough-like extrudate having individual filaments in the gap of the trough. Thermoplastic filaments are extruded from the openings in the outer die 11a proximate the gap, and oscillation of the outer die produces a net-like overlay over the gap as described above.

Inner mandrel 48 is supported on shaft 18 below die 10a by suitable means, such as lock units 49. The inner mandrel is maintained in fixed angular relation to die 10a by suitable means such as key 47, and supports extruded trough 33 while the extrudate is shaped by outer mandrel 22. Outer mandrel 22 is supported by conventional means in fixed relation to the inner mandrel and the extrudate. In the embodiment illustrated, outer mandrel 22 is so shaped as to guide extruded filaments 34 and 36, as well as the free edges of trough-like extrudate 33, toward the surface of inner mandrel 48.

Figure 8:
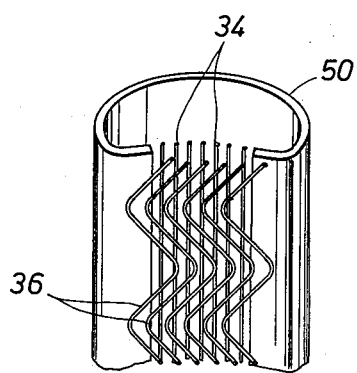
FIG. 8 is a pictorial view of a segment of a product produced by the die head and mandrels of FIG. 6.

The resulting extruded product has a cross section generally in the shape of a crescent with an open segment or gap in the concave surface. Straight filaments 34 are parallel to free edges of the trough-like extrudate, and filaments 35 are overlaid in a generally oscillatory pattern and bonded to both trough-like extrudate 33 and filaments 34 as illustrated by FIG. 8.

Figure 7:
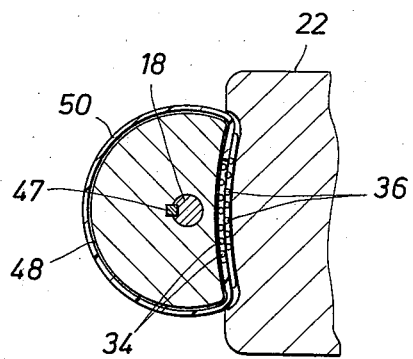
FIG. 7 is a top view in section of the product and mandrels of FIG. 6 and taken along the line 7—7.

FIG. 7 is a top sectional view taken at line 7—7 of FIG. 6. This figure illustrates the cross section of mandrels 22 and 48 as well as the finished product. The product is further illustrated in perspective by FIG. 8. In FIG. 7, the trough-like extrudate's free edges have been turned inwardly by the mandrels to form a generally crescent-shaped cross section now designated by reference numeral 50. The product of this embodiment is particularly useful as roof gutters as well as having other applications similar to those of the product illustrated by FIG. 4. One advantage of this configuration is that the inward-turning edges of the trough will cause rain or other fluids thereon to flow toward the opening in the trough when the trough is horizontal with its opening facing upwardly, giving a better effective area for catching and collecting fluids.

It will be apparent that the shape of the trough-like extrudate and the locations of the extruded filaments may readily be determined by appropriately shaped and placed mandrels, and that the free edges of the trough may be turned outwardly as easily as inwardly by corresponding variation of mandrel shapes. It will also be apparent that, in turning the free edges of the trough-like extrudate outwardly, the inner mandrel may serve to shape the extrudate and locate the extruded filaments while the outer mandrel serves a supporting function. In the production of other embodiments, each mandrel may perform shaping and support functions, or additional mandrels may be used to produce the desired shape. For example, filaments may be located substantially in or parallel to the plane defined by the free edges of the trough-like extrudate, or may be located in convex, concave, or a combination convex and concave relation to that plane, depending on the mandrels selected. Of course, many shapes of trough-like extrudate may satisfactorily be produced using a single mandrel, or no mandrel at all.

While the invention has been described with reference to particular embodiments, it is understood that this description is not meant to be construed in a limiting sense. Various modifications of the disclosed invention, such as, for example, trough-like extrudates of complex cross section, will be apparent to persons skilled in the art upon reference to this description. It is therefore contemplated that the appended claims will cover any such modifications or embodiments as fall within the true scope of the invention.

What is claimed is:

1. An extruded plastic product which comprises: an elongated hollow tubular member of extrudable thermoplastic having a configuration generally corresponding to a hollow cylinder having an open segment extending the length of said member to define a self-supporting trough shaped member; and a set of filaments of extrudable thermoplastic extending transversely with respect to the open segment of said tubular member, each of the filaments of said set being fused to a surface of said tubular member to define an overlay proximate the open segment of said member.

2. The extruded plastic product of claim 1 wherein said trough shaped member has a sectional configuration corresponding to a cresent and the open segment is located in the concave portion of the crescent.

3. The extruded plastic product of claim 1 wherein said filaments are disposed spirally about the exterior surface of said trough shaped member.

4. The extruded plastic product of claim 1 wherein each of said filaments traverses the open segment of said trough shaped member in oscillatory fashion and is fused to the surface of said member on opposing sides of said open segment to define a net overlay across said open segment.

5. An extruded plastic tubular product comprising:
an elongated, hollow, rigid tubular member of extrudable thermoplastic having a longitudinal gap extending the length of said member;
a first set of filaments of extrudable thermoplastic disposed proximate said gap and extending transversely with respect to said gap, at least some of the filaments of said first set being fused to the surface of said tubular member to define an overlay across said gap; and
a second set of parallel spaced apart filaments of extrudable thermoplastic disposd between and parallel to the edges of said gap, each filament of said second set intersecting and fused to at least one filament of said first set to form a net overlay across said gap.

6. An extruded plastic tubular product as recited in claim 5, wherein each of the filaments of said first set extends back and forth across said gap in an oscillating pattern and is fused to said member at each side of said gap to define a net overlay across said gap.

7. An extruded plastic tubular product as recited in claim 5, wherein each filament of said first set extends transversely back and forth across said gap, intersecting and fused to each filament of said second set and to each side of said gap to form a net overlay across said gap.

8. An extruded plastic tubular product as recited in claim 5, wherein said tubular member has a crescent shaped cross section and said gap is located in the concave region of said crescent.

9. An extruded plastic tubular product as recited in claim 5, wherein said tubular member has a wall thicknes of about 100 mils and each filament of said first and second sets has a diameter of about 100 mils.

10. An extruded plastic product which comprises:
an elongated, hollow, rigid tubular member of extrudable thermoplastic having a configuration generally corresponding to a hollow cylinder having a substantially uniform wall thickness and a longitudinal gap extending the length of said member to define a self-supporting trough shaped member, said wall thickness and the width of such gap being much less than the inside diameter of said hollow cylinder;
a first set of filaments of extrudable thermoplastic extending transversely with respect to said gap, at least some of the filaments of said first set being fused to a surface of said tubular member, said filaments of said first set being substantially parallel to one another and extending back and forth across said gap in an oscillating pattern; and
a second set of parallel, spaced apart filaments of extrudable thermoplastic disposed between and parallel to the edges of said gap, each filament of said second set intersecting and being fused to at least one filament of said first set to form a net overlay across said gap.

* * * * *